Jan. 28, 1936.  G. W. SMITH  2,028,812
CONTROL SYSTEM FOR BOILER FURNACES
Filed May 25, 1934  3 Sheets-Sheet 1

INVENTOR
George W. Smith
By Green & McCallister
His Attorneys

Jan. 28, 1936.  G. W. SMITH  2,028,812
CONTROL SYSTEM FOR BOILER FURNACES
Filed May 25, 1934  3 Sheets-Sheet 3

INVENTOR
George W. Smith
By Green & McCallister
His Attorneys

Patented Jan. 28, 1936

2,028,812

UNITED STATES PATENT OFFICE 2,028,812

CONTROL SYSTEM FOR BOILER FURNACES

George W. Smith, Pittsburgh, Pa., assignor to John M. Hopwood, Dormont, Pa.

Application May 25, 1934, Serial No. 727,473

16 Claims. (Cl. 236—15)

This invention relates to boiler furnaces having control apparatus for automatically adjusting the supply of fuel and air and the draft by and in accordance with changes in load, and more particularly to apparatus for regulating the draft by and in accordance with changes in the load.

An object of this invention is the provision of a regulating system of the character above referred to, whereby separate but related control impulses may be transmitted to fuel supply and draft regulating apparatus for the purpose of adjusting the fuel supply and draft by and in accordance with changes in the load demand.

Another object of the invention is the provision of apparatus in which the draft losses across the boiler may be reproduced in miniature and varied by and in accordance with the load demand, and by means of which the draft at the furnace outlet may be adjusted by and in accordance with changes in draft losses in the suction line.

Another object of the invention is the provision of a conduit or pipe line which is connected at one end to a source of suction and open to the atmosphere at the other end, and provided with a variable orifice and a fixed orifice between the suction source and the variable orifice, and of apparatus responsive to changes in pressure conditions between the orifices for so adjusting the suction source that the pressure between said orifices is maintained substantially constant for all positions of the variable orifice.

A further object of the invention is the provision of means whereby the value of pressure between spaced orifices in a pipe line through which either a gaseous or fluid medium flows may be adjusted to and maintained substantially constant at any desired fraction of the value of the pressure at the source or cause of such flow.

Other objects of the invention will, in part, be apparent and will, in part, be obvious, from the following description taken in conjunction with the accompanying drawings, in which:—

Throughout the drawings and specification, like reference characters indicate like parts.

Figure 1:
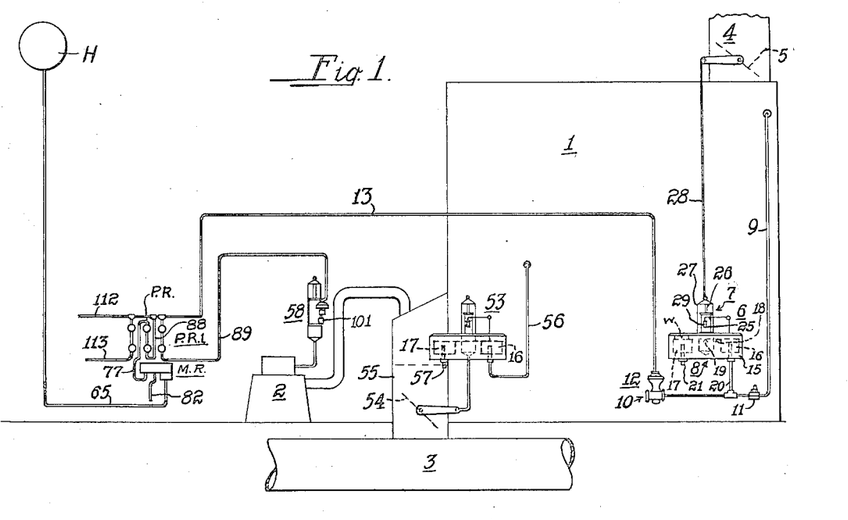
Figure 1 is a more or less diagrammatic view of a boiler furnace provided with a control system embodying one form of the invention.

In Fig. 1 of the drawings a boiler furnace 1 is shown which is provided with apparatus 2 for supplying comminuted or pulverized fuel to the furnace. Combustion air is delivered to the furnace by a pipe or duct 3 to which a forced draft fan (not shown) is connected for supplying the air required. At the outlet of the furnace, a conduit 4 conveys the products of combustion to a stack (not shown). Conduit 3, it will be understood, is connected to an induced draft fan (not shown) and is provided with an outlet damper 5 for adjusting the draft.

The outlet damper 5 is connected to a regulator 6 which is controlled by a master regulator M. R. and a proportioning relay P. R. to operate by and in accordance with changes in the load on the boiler, or in the demand for steam, so that the outlet damper will be adjusted to vary or regulate the draft at the outlet of the boiler by and in accordance with the load or demand for steam. Regulator 6 includes an actuating device or motor 7 which operates the damper, and a suction responsive apparatus 8 that controls the motor 7. Apparatus 8 is connected to a suction line 9, one end of which is open to the atmosphere at 10 and the other end of which is connected to the outlet of the furnace. In the suction line, a fixed but adjustable orifice 11, and a variable orifice 12 are provided. The fixed, but adjustable orifice 12, as shown, is disposed between the outlet of the furnace and the variable orifice. The suction responsive apparatus of regulator 6 is connected to suction line 9 at a point between orifices 11 and 12 so that regulator 6 will function by and in accordance with relative changes in draft losses across these orifices and damper 5 which in effect is also an orifice.

Variable orifice 12 is operated by a pressure responsive element, to be later described herein, which is under the influence of pressure impulses received from an impulse line 13, which impulses are controlled by a master regulator M. R. and a relay P. R. and caused to vary by and in accordance with changes in load on the boiler. As the opening in the variable orifice is changed in response to changes in the load on the boiler, the suction between orifices 11 and 12 varies or changes. In response to such changes in suction, the suction responsive apparatus 8 of regulator 6 causes the outlet damper 5 to be shifted to such a position that the suction in that portion of line 9 between orifices 11 and 12 is restored to a value for which the regulator was originally adjusted to be in equilibrium; that is, regulator 6 shifts or adjusts the outlet damper to such a position that the suction in the line between orifices 11 and 12 is restored to and maintained substantially constant at a predetermined value.

Apparatus 8 is of the type disclosed in Patent No. Re. 18,479, issued on 24th day of May, 1932, and comprises a chamber 15 having a supply of liquid therein, such as oil or water, and a pair of inverted floats or bells 16 and 17 attached to a beam 18 that is mounted to rock on a fulcrum 19. The open ends of the bells are submerged in the liquid of the chamber 15.

The interior of float 16 is connected by pipe 20 to suction line 9 at a point between orifices 11 and 12 and the interior of float 17 is connected by a pipe 21 to the atmosphere. Therefore in response to the creation of suction in float 16 the float beam will rock clockwise.

In order that the float beam may come to rest in a position of stable equilibrium when the suction acting on float 16 is of a predetermined value, the beam should be so loaded that such balance occurs at such value of suction. This loading may be accomplished by placing a balancing weight W on the float beam at some point to the left of fulcrum 19.

With this arrangement, the float beam will rock clockwise as the suction increases, with respect to the value of suction for which it was initially balanced, or counterclockwise, under the action of weight W as the suction decreases from said value.

Motor device 7 comprises a cylinder 25 in which a piston (not shown) is disposed and provided with a piston rod 26 to which a frame 27 is attached. Frame 27 is connected by a rod 28 to the crank arm of the outlet damper 5. The piston in cylinder 25 may be operated hydraulically or by a fluid under pressure, such as compressed air, and the admission of such motive fluid to the cylinder at one side or the other of the piston is controlled by pilot valve 29 which is connected for operation to the float beam 18. This regulator as disclosed in the above-mentioned patent, includes a system of levers and linkages (not shown) which is operated in response to the extent of movement of regulator frame 27, for returning the pilot valve to "off" position each time the regulator frame has been moved a distance proportional to the extent to which the valve is opened in one or the other of its "on" positions. That is, if the valve is opened a definite amount in one of its "on" positions, say in response to float 16 moving upwardly, the regulator frame moves upwardly a predetermined distance until the system of levers and linkages, above mentioned, returns the valve to "off" position, at which time the regulator frame is brought to rest. If the valve is opened a definite amount in the other of its "on" positions in response to float 16 moving downwardly, the regulator frame moves downwardly a predetermined distance, and shifts outlet damper 5 towards closed position, after which the valve is returned to "off" position by the system of levers and linkages, above mentioned.

Thus, regulator frame 27, under control of mechanism 8 will move either up or down in incremental, large or intermediate steps depending upon the extent of movement of float beam 18 to effect step-by-step adjustment of damper 5 in accordance with changes in suction in that portion of suction line 9 between orifices 11 and 12.

In the operation of a boiler furnace, the draft or suction at the furnace outlet, (the point at which line 9 is connected thereto) may be as high as ten or twelve or more inches of water, but with the arrangement of orifices provided in line 9, the suction acting on float 16 may be adjusted for a relatively small fraction of the value of suction at the furnace outlet. For example, if the suction at the furnace outlet is equal to ten inches of water, orifices 11 and 12 may be so adjusted that the suction acting on float 16 is equal to only say one inch of water or any other fractional value of the suction at the furnace outlet which is sufficient to develop the power required to operate pilot valve 29. Thus when these orifices have been adjusted for a given value of draft and load demand, the suction acting on float 16 will be maintained substantially constant at that value which places the float mechanism in balance.

When a change in load occurs requiring a different value of draft, orifice 12 is adjusted, in response to a change in the control impulses transmitted to line 13, to a new position, thereby changing the suction between the orifices in line 9. The float mechanism immediately responds to this change in suction and causes regulator frame 27 to shift damper 5 to such a position that the suction between orifices 11 and 12 is restored to the value for which the float mechanism was originally balanced. In this manner, the draft at the outlet is regulated by and in accordance with changes in load without at any time subjecting float 16 to the full amount of suction which is maintained at the furnace outlet.

Figures 4, 5, 6:
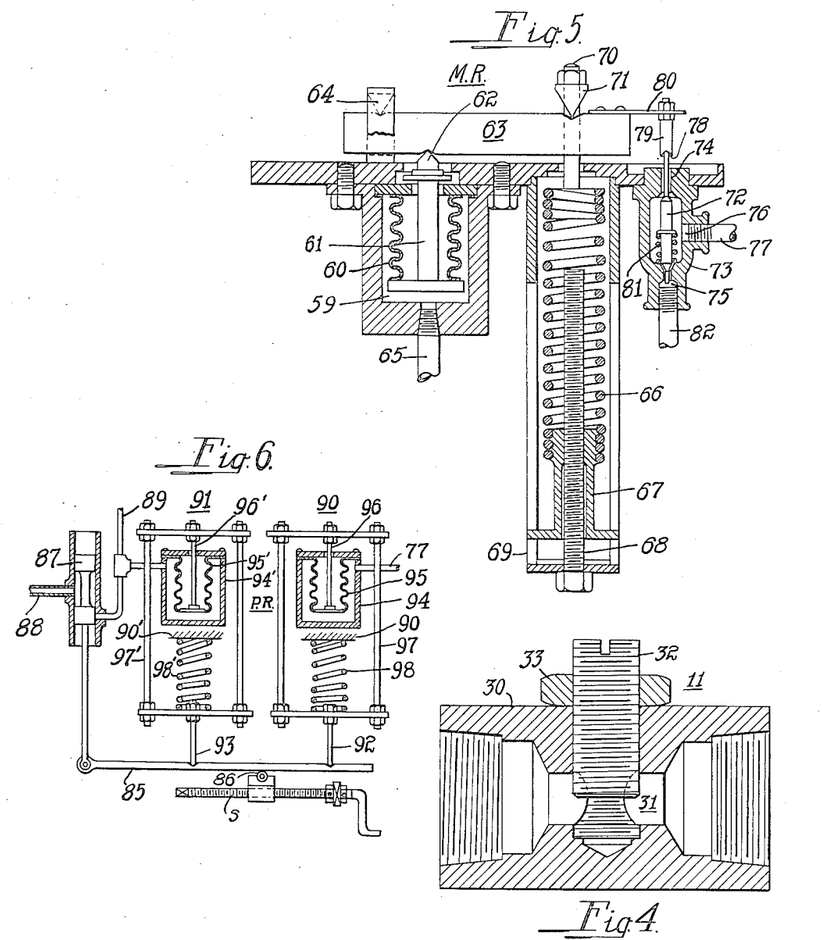
Fig. 4 is a view in section of a fixed, but adjustable, orifice employed in a suction line of the system of Fig. 1, in conjunction with the valve or orifice of Fig. 2.
Fig. 5 is a view in section of a master regulator embodied in the system of Fig. 1.
Fig. 6 is a more or less diagrammatic view, partially in section, of a proportioning relay embodied in the system of Fig. 1.

Orifice 11, as previously stated, is fixed, but adjustable, that is, the area of the orifice is adjustable, but does not change in area once it has been adjusted for a particular area. This orifice may take various forms and as illustrated in Fig. 4, comprises an orifice body 30 which is tapped at its opposite ends for connection in line 9. The middle portion of the body has a relatively small bore 31 in which the orifice is located. Body 30 is tapped transversely of bore 31 for the reception of a threaded orifice plug 32, and this plug is preferably larger in diameter than bore 31 so that as the plug is screwed in or out, the orifice area is confined between the lower end of the orifice plug and the wall of bore 31 immediately opposite the same. By turning orifice plug 32 in one direction or another, the size or area of the orifice may be adjusted and when once adjusted, the orifice plug is locked by means of a nut 33.

Figure 2:
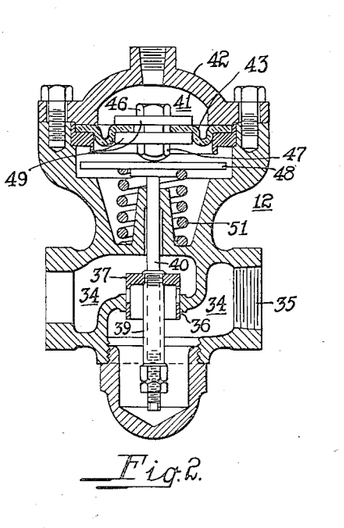
Fig. 2 is a view in section of a suction adjusting valve or orifice embodied in the apparatus of Fig. 1.

Orifice 12 is illustrated in Fig. 2 and comprises a valve body having a passageway 34 therein one end of which is open to the atmosphere and the other end of which is threaded as at 35 for connection to suction line 9. Within the valve body is an opening 36 in which a valve 37 is movably disposed for controlling the size of the opening or the area of the orifice in the passage above mentioned.

Valve 37, as shown, is of cup-like form and provided with openings 38 in the wall thereof which cooperate with the wall of opening 36 to define the area of the orifice. Valve 37 is secured to a tubular member 39 through which a stem 40 extends and on which the tubular member is threaded. Stem 40 extends upwardly through the valve body into a diaphragm chamber 41 which is closed at the top by means of a cap 42 bolted to the valve or orifice body. A flexible diaphragm 43 disposed in chamber 41 and having its outer edge clamped in pressure tight relationship between a member 44 and an annular shoulder 45 formed on the cap 42, forms the bottom of chamber 41. The central portion of the diaphragm is apertured to accommodate a bolt 46 the head 47 of which rests on a thrust plate 48 secured to the upper end of stem 40. The opening through which the bolt passes is sealed by means of washers 49 disposed on opposite sides of the diaphragm and between the head and nut of bolt 46. A compression spring 51 disposed below thrust plate 48 works against the diaphragm so that as the pressure transmitted to the chamber 41 varies, valve 37 will be shifted thereby varying the size of the orifice. The pressure impulses which operate on diaphragm 43 are transmitted on the diaphragm chamber by impulse line 13, which impulses are, as previously stated, varied by and in accordance with variations in the demand for steam or the load on the boiler.

In the system herein disclosed, when the boiler is operating at maximum load, the impulse pressure acting on diaphragm 43 is at its minimum value; and at minimum load, the impulse pressure acting on the diaphragm is at its maximum value. Therefore, in making the necessary adjustments of regulator 6 and the orifices 11 and 12, valve 37 is adjusted by turning the tubular member 39 either up or down on stem 40 until the orifice in the passage through valve body is closed. Orifice 11 is opened wide after which the float mechanism of regulator 6 is loaded by adjusting weight W until damper 5 is adjusted to a position for minimum draft to be carried at the outlet of the boiler. The impulse pressure acting on diaphragm 42 is next adjusted to its maximum value which causes orifice 12 to open wide, after which orifice plug 32 of orifice 11 is gradually closed until regulator 6 adjusts damper 5 to the position which will establish the minimum draft to be carried at the outlet of the furnace.

In the system herein illustrated, the rate at which air for combustion is supplied to the furnace is regulated by and in accordance with the draft at the outlet of the furnace. This is accomplished by means of a balanced float regulator 53 that responds to changes in the pressure in the combustion chamber of the furnace and adjusts a damper 54 disposed in a conduit 55 through which air passes from the supply pipe 3 to the furnace. Regulator 53 is similar in all respects to regulator 6 except that the loading weight W is omitted. For this reason, similar and corresponding parts are indicated by the same reference characters.

Regulator 53 is adjusted to maintain a predetermined pressure in the combustion chamber. If this pressure departs from that value, as occasioned by a change of position or setting of the outlet damper 5, regulator 53 responds and shifts damper 54 to such a position that more or less air is admitted to the furnace to reestablish the pressure in the furnace chamber at the desired value. Thus, if damper 5 is being opened to increase the draft the pressure in the furnace chamber tends to fall, and to bring this pressure back to the constant value which is desired, the air control damper 54 is opened an amount sufficient to restore the pressure in the furnace to the desired value. Likewise, if outlet damper 5 is shifted towards closed position, the pressure in the furnace chamber tends to rise and in response to such rise in pressure regulator 53 shifts the air control damper 54 towards closed position, thereby reducing the amount of air delivered to the furnace and, consequently, the pressure in the furnace chamber is reduced.

Since the pressure in the furnace chamber is a measure of the air flow through the furnace for a given value of draft at the outlet of the furnace, it follows that if regulator 53 maintains the furnace chamber pressure constant, the rate of air supply to the furnace will be directly proportional to the draft. Since the draft is regulated by and in accordance with the variations in steam pressure or the demand for steam, the rate of air supply will, therefore, be regulated by and in accordance with the demand for steam.

In order that regulator 53 may respond to the pressure in the furnace chamber the interior of the inverted bell or float 16 is placed in communication with the combustion chamber of the furnace by means of a pipe or conduit 56 and the interior of the inverted bell or float 17 is placed in communication with the atmosphere by means of a pipe 57. Therefore, if the regulator 53 is adjusted to maintain the pressure in the furnace chamber at a value say equal to atmospheric pressure, the float beam of regulator 53 will be in balance when the pressures acting on floats 16 and 17 are equal. Since the pressure acting on float 17 does not change, any change in pressure acting on float 16 will cause the regulator to function and shift damper 54 in the proper direction to restore the pressure to the balancing value.

The combustion regulating system illustrated also includes a regulator 58 that regulates the rate of fuel delivery to the furnace by and in accordance with the demand for steam and this regulator is under the control of master regulator M. R. and a proportioning relay P. R. 1. Since the regulation of the supply of fuel and the supply of air is by and in accordance with the demand for steam on the boiler, it follows that the supply of air and fuel will bear the proper relation, one to the other, for efficient combustion.

The master regulator M. R. is illustrated more or less in detail in Fig. 5; and the proportioning relays P. R. and P. R. 1, which, as illustrated, are identical in construction, are illustrated more or less in detail in Fig. 6; and the fuel supply regulator 58 is illustrated in detail in Fig. 3. These devices will now be described in order.

The master regulator M. R. comprises a pressure-tight chamber 59 in which a bellows 60 is disposed. The bellows is connected by a push rod 61 to a knife edge 62 that bears against the under-side of a beam 63 which is fulcrumed on a knife edge 64 disposed to the left of knife edge 62 as seen in Fig. 5 and bearing on the top of the beam. Steam pressure is conveyed to chamber 59 by means of a pipe 65 and this pressure will compress, or collapse the bellows and cause beam 63 to turn about its fulcrum. The force exerted by the steam pressure, on and tending to turn beam 63 is counter-balanced by means of a tension spring 66 one end of which is anchored to a support 67 that is adjustably connected to an adjustment screw 68 carried by a rigid frame 69. The upper end of spring 66 is connected to the top of beam 63 by means of a rod 70 and knife edge 71. Movement of beam 63 in response to variations in steam pressure, as communicated to chamber 59, are utilized to operate a pilot valve 72 disposed in a three-way valve body 73.

Valve body 73 has an exhaust port 74, an inlet port 75, and an outlet port 76. The opposite ends of valve 72 are tapered and coact with the inlet and outlet ports to effect such a throttling action that for each position between wide open and closed positions, a definite pressure is maintained within the valve body and in the pipe line 77 which is connected to the outlet port 76. The opposite ends of the valve 72 are provided with extensions that extend through the outlet and inlet ports and serve as guides for the valve. The upper extension rests in a recess 78 formed in the lower end of a stem 79 secured to a resilient strip 80 carried by beam 63. Valve 72 is urged upwardly by means of a coil spring 81 to ensure that the upper extension of valve 72 will always be in engagement with stem 79.

The inlet port of the valve body is connected by a pipe 82 to a source of fluid under pressure such as compressed air, the pressure of which is maintained constant and pipe line 77 is connected to proportioning relay P. R.

When valve 72 is in such a position as to completely close the inlet port 75 the pressures in pipe line 77 and in the interior of the valve body are equal to atmospheric; when the exhaust port is completely closed and the inlet port is wide open, the pressures in line 77 and in the interior of the valve body are equal to the pressure of the air in the supply pipe 82; and when valve 72 is in any position between those just mentioned the pressure in the pipe 72 will be of some intermediate value which is fixed by the rate at which air enters the valve body from the supply pipe 82 and exhausts from the valve body through the exhaust port.

The pressure impulses delivered by pipe 77 to proportioning relay P. R. cause this relay to function and transmit pressure impulses to pipe line 13 and the value of these pressure impulses will bear a fixed relation to the pressure impulses transmitted to pipe line 77 and these impulses in turn bear a fixed relation to the steam pressure acting on the diaphragm or bellows disposed in chamber 79 of the master regulator M. R.

The proportioning relays P. R. and P. R. 1 are each of the same construction and function in substantially the same manner, and for this reason only one relay has been shown in detail. As illustrated in Fig. 6 the proportioning relays, each comprise a beam 85 which is fulcrumed on an adjustable fulcrum 86. Beam 85 is operatively connected to a pilot valve 87 which transmits pressure impulses from a supply pipe 88 having a pressure medium therein such as compressed air, at a substantially constant pressure, to a sending line 89. Beam 85 is rocked about its fulcrum by means of pressure responsive devices 90 and 91 having knife edge connections 92 and 93 with beam 85 on opposite sides of fulcrum 86. Device 90 comprises a chamber 94 in which a bellows 95 is disposed and which is subjected to the pressure impulses delivered to pipe 77 by the master regulator M. R. The bellows is connected by a push rod 96 which is secured to a yoke 97, to the lower end of which the knife edge 92 is secured. A compression spring 98 disposed between a rigid support 99 and the lower end of the yoke 97 acts in opposition to the forces exerted by bellows 95 on the yoke so that the net force exerted by knife edge 92 on beam 85 is equal to the difference between the forces exerted by spring 98 and bellows 95 on yoke 97.

Device 91 is similar in construction to device 90 and for this reason similar elements are designated by similar reference characters primed. The interior of chamber 94' is connected to pipe line 89 so that the pressure transmitted to pipe line 89 also acts on bellows 95'. The force exerted by knife edge 93 on beam 85 is equal to the difference between the forces exerted by spring 98' and bellows 95' on yoke 97'.

If the distances between fulcrum 86 and knife edges 92 and 93 are equal and springs 98 and 98' are adjusted to equal tensions, with no pressure acting on bellows 95 and 95' beam 85 will be in balance and valve 87 will be in position to shut off communication between the supply pipe 88 and impulse line 89. If a pressure is transmitted to chamber 94, bellows 95 will contract and decrease the force exerted by knife edge 92 on lever 85 causing the beam to turn counter-clockwise as seen in Fig. 6 and move valve 87 downwardly to place the supply pipe 88 in communication with pipe 89 and the interior of chamber 94'. The pressure in chamber 94' and pipe 89 will continue to increase until the force exerted by knife edge 93 is decreased to a value which is equal to the force exerted by knife edge 92 on beam 85 at which time the beam is placed in balance and the valve returned to off position. If the pressure in chamber 94 is decreased the opposite action takes place in that knife edge 92 bears with greater force than knife edges 93 bear on beam 85, so that the lever is rocked clockwise as seen in Fig. 6, raising valve 87 and placing pipe line 89 and chamber 94' in communication with the atmosphere, thereby decreasing the pressure in both.

When this pressure has decreased to a value at which the forces of knife edges 92 and 93 are in balance, the valve is again returned to closed position.

If, as stated previously herein, the distances between fulcrum 86 and knife edges 92 and 93 are equal and the areas of bellows 95 and 95' are equal, equal pressures in chambers 94 and 94' will place beam 85 in balance and hold valve 87 in off-position, that is, in that position in which there is no communication between pressure supply pipe 88 and pipe 89, or between pipe 89 and chamber 94' and the atmosphere.

If fulcrum 86 is shifted longitudinally on its support screw S different pressures in chamber 94' than are transmitted to chamber 94, will place beam 85 in balance. In other words, if fulcrum 86 is shifted towards knife edge 93 higher pressures will be required in chamber 94' than in chamber 94 to maintain beam 85 in balance, and if the fulcrum is shifted towards knife edge 92 lower pressures in chamber 94' than in chamber 94 are required to place the beam in balance.

Figure 3:
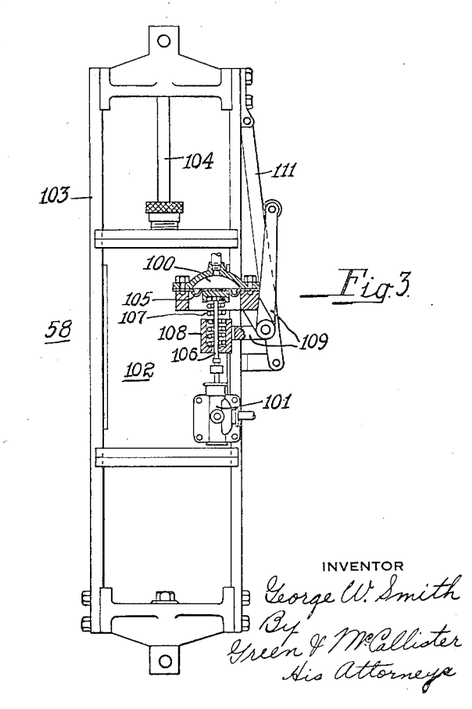
Fig. 3 is a view of a regulator for controlling the rate of fuel supply to the furnace.

The pressure impulses transmitted to pipe 89 of relay P. R. are transmitted directly to diaphragm chamber 41 of the variable orifice 12 via pipe 13 and to chamber 94 of relay P. R. 1 via pipe 77 which is connected to pipe 13. Pipe 89 of relay P. R. 1 is connected to the diaphragm chamber 100 of regulator 58. The pressure impulses delivered to chamber 100 are utilized for operating a pilot valve 101 that controls the admission of motive fluid to one side or the other of a piston working in a cylinder 102.

Regulator 58 operates in substantially the same manner as regulators 6 and 53 in that its frame 103 which is carried by piston rod 104 effects step by step adjustment in either direction of the fuel supply or feeding mechanism 2.

Since the proportioning relays may be adjusted to send control impulses to apparatus to be controlled thereby, which bear a fixed adjustable relation to the impulses received by the diaphragm chamber 94 thereof, it follows that the pressure impulses delivered to the diaphragm chamber of orifice 12 and to the diaphragm chamber 100 of the fuel regulator 58 will bear a fixed relation to each other and that the proper relation between the supply of fuel and the supply of air will be maintained throughout the full operating range of the boiler. The pressure impulses transmitted to pipe lines 13 and 89 will also bear a definite or fixed but adjustable relation to variations in the steam pressure of the boiler, because the pressure impulses transmitted to pipe line 77 connected to valve body 73 associated with the master regulator M. R. bear a direct relationship to the steam pressure acting on the bellows disposed in diaphragm chamber 59.

Pilot valve 101 of regulator 58 is connected in operative relationship to a diaphragm 105, which forms the bottom of diaphragm chamber 100, by means of a stem 106. The diaphragm operates against a compression spring 107, one end of which is disposed in a socket 108 which is raised or lowered, depending on the direction of travel of the regulator frame 103, by means of a bell crank 109 secured to cylinder 102 and operated by an angling bar 110 carried by frame 103. If the pressure impulses delivered to chamber 100 are increasing, the diaphragm will move downwardly and operate pilot valve 101 in such direction that regulator frame 103 moves upwardly. As the frame moves upwardly bell crank 109 is turned clockwise thereby raising socket 108 and compressing spring 107 an amount sufficient to return the pilot valve to its off position, at which time the regulator frame comes to rest. If the pressure impulses delivered to chamber 100 continued to increase the same action is repeated so that step-by-step movement of the regulator frame in an upward direction is effected.

If the pressures delivered to chamber 100 are decreasing the pilot valve is moved upwardly under the action of spring 107, with the result that frame 103 moves downwardly. As the frame moves downwardly, socket 108 is moved downwardly by bell crank 109 so that the force exerted by spring 107 against the diaphragm is decreased by an amount sufficient to allow the diaphragm to return the valve to off position. If the pressures continue to decrease, the action just described is repeated so that step-by-step movement of the regulator in a downward direction is effected.

In Fig. 1, a proportioning relay P. R. 2, is shown, chamber 94 of which is connected to a pipe line 112 which in effect is an extension of pipe line 13. This proportioning relay would be utilized to transmit impulses to a pipe line 113 for controlling the operation of a fuel supply regulator, such as indicated at 58, associated with another boiler, while pipe line 113 would lead to a variable orifice such as indicated at 12, associated with the draft regulator of another boiler. In other words, by means of a single master regulator M. R. and one proportioning relay P. R. and a plurality of proportioning relays P. R. 1, P. R. 2, etc. a whole group of boilers could be controlled, the number of boilers controlled being equal to the number of proportioning relays P. R. 1, P. R. 2, etc. employed. Since the proportioning relays are individually adjustable and since the variable orifices 12 are also individually adjustable, each boiler in the group or bank could be operated at the same or different ratings, and each would supply its proportionate share of steam to the main steam header for the group.

Figure 7:
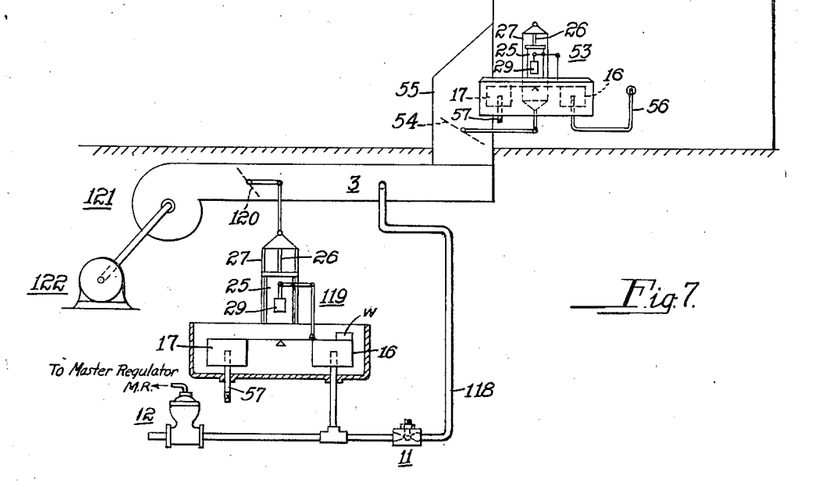
Fig. 7 is a more or less diagrammatic view of a furnace showing the control apparatus illustrated in Fig. 1 in connection with the control and regulation of the draft, as applied to the regulation of the pressure of the air supply to facilitate and make possible a more accurate control of the supply of combustion air to the furnace.

Orifices 11 and 12 may also be utilized to vary the air pressure in duct 3 by and in accordance with the load, in which case regulator 53 and its damper 54 may be rendered more efficient in the regulation of the furnace air supply. In Fig. 7, a control system is shown in which orifices 11 and 12 are employed for this purpose. These orifices are connected in a conduit or pipe line 118 between which the float responsive mechanism 8 of a regulator 119 is connected. Regulator 119 operates a damper 120 disposed in air supply conduit 3 to which a forced draft fan or blower 121, driven by a motor 122, is connected. Regulator 119 operates to so adjust damper 120 that the pressure between orifices 11 and 12 is maintained substantially constant at some predetermined value, say for example, one inch of water. In so adjusting damper 120, the pressure of the air in that portion of duct 3 between dampers 54 and 120, is caused to vary by and in accordance with the load on the boiler (because orifice 12 would be under the control of a master regulator M. R., as in Fig. 1). While regulator 119 will maintain the pressure between orifices 11 and 12 at a constant value of say one inch of water, the pressure in the duct 3 would, at high boiler ratings, be higher than one inch of water and, at low ratings, would be equal to or approximately equal to one inch of water. Since the pressure in this portion of duct 3 is varied in this manner, it is possible to confine the operation of damper 54 within its most efficient regulating range (usually the middle of its range) for all values of load or rating at which the boiler is required to operate.

In this arrangement, air flows from duct 3 to line 18 and orifices 11 and 12 to the atmosphere; therefore, the pressure in line 118 between these orifices to which the float mechanism of regulator 119 responds, is dependent on the relative pressure drop across these orifices which in turn, is dependent on the pressure in duct 3 as effected by the position of damper 120 and the size of the opening or passage through orifice 12.

But, since regulator 119 operates to maintain the pressure between orifices 11 and 12 constant, it follows that any change in pressure in duct 3 as effected by a change in position of damper 54, will result in a change in pressure between these orifices, and such change in pressure will cause regulator 119 to shift damper 120 to that position which will restore the pressure between these orifices to the constant value for which the regulator is adjusted to maintain.

Likewise, any change in size of the passage through orifice 12, as effected by a change in load or demand for steam on the boiler, will result in a change in pressure between orifices 11 and 12. As a consequence, regulator 119 will shift damper 120 to such a position that the pressure in duct 3 is adjusted to a value that will establish and restore the pressure between orifices 11 and 12 to that constant value for which it is adjusted to maintain.

If, for a given setting or adjustment of orifice 12 and damper 120, a change in pressure in duct 3 is occasioned by a change in position of damper 54, in response to a change in draft at the outlet of the furnace, either as the result of a change in load on the boiler, or for any other reason, a change in pressure will occur in line 118 between these orifices and effect such adjustment of damper 120, through the agency of regulator 119, as will establish the proper pressure in duct 3. Thus, it is apparent that a change in pressure in line 118 between orifices 11 and 12, whether effected by the master regulator M. R. in response to a change in load, or by an adjustment of damper 54, in response either to a change in furnace pressure, to a change in the setting of the outlet damper or by a change in draft for any other reason, will result in such operation of regulator 119 and adjustment of damper 120 as will restore the pressure between orifices 11 and 12 to a preselected constant value and thereby maintain the pressure in duct 3 at the proper value. Not only is the pressure in duct 3 maintained at the proper value for all furnace operating requirements, but it also makes possible the operation of damper 54 in that range of its travel where it is most efficient from the standpoint of regulating the rate at which air is supplied to the furnace.

Figure 8:
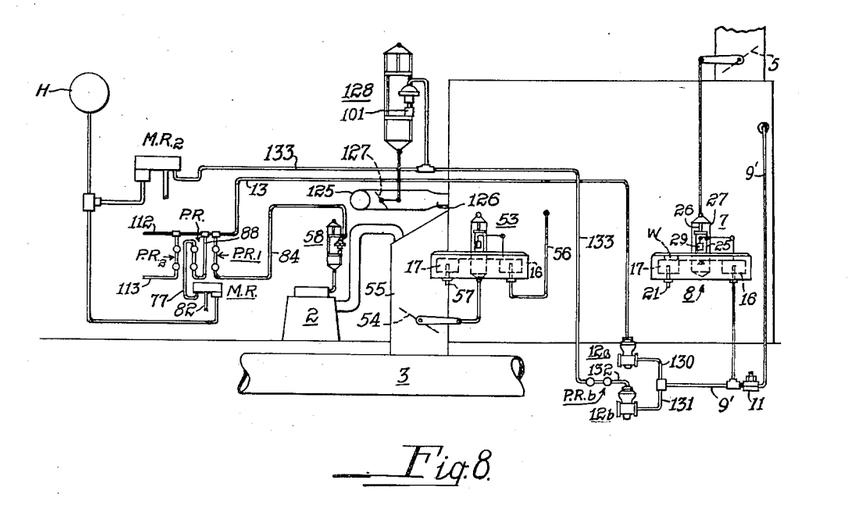
Fig. 8 is a more or less diagrammatic view of a boiler furnace provided with a plurality of sources of supply of different fuels, and a control system, such as shown in Fig. 1, for regulating the draft, modified to regulate the draft by and in accordance with the demand for steam and the total amount of fuel delivered to the furnace by such sources of supply.

In Fig. 8, the invention has been shown in an embodiment which provides for the control of a plurality of different fuel supplies for the furnace, and the draft, by and in accordance with the load, and consequently, for the regulation of the air supply by and in accordance with the total amount of the fuels supplied to the furnace. In this figure, apparatus 2 feeds solid fuel to the furnace and is under the control of regulator 58, master regulator M. R. and proportioning relays P. R. 1 and P. R. 2, as in Fig. 1. Another supply of fuel, such as gas, is provided for the furnace. The gas is delivered from a main header 125, (which may supply a bank of furnaces) through a pipe 126 in which a control damper 127 is disposed. Damper 127 is operated by a regulator 128 under the control of a master regulator M. R. 2, like master regulator M. R., so that the supply of gas to the furnace is regulated by and in accordance with the demand for steam, regulator M. R. 2 being connected to steam header H.

The air required for combustion is supplied by a duct 3 through a duct 55 to the furnace, a damper 54 controlled by regulator 53 adjusting the rate of air supply so as to maintain the pressure in the furnace combustion chamber substantially constant. The control for the air supply, as shown, is the same as that shown and described in connection with Fig. 1.

As disclosed in connection with the apparatus of Fig. 1, the draft at the outlet of the furnace is controlled by and in accordance with the demand for steam and that the rate of air supply being dependent on the draft, is also controlled by and in accordance with the demand for steam. Where two or more different fuels are supplied to the furnace, the rate of air supply should be regulated by and in accordance with the total rate of supply of all the fuels employed.

To accomplish this type of control, an adjustable orifice is provided for each fuel supply (these orifices being designated as 12a and 12b, but which are of the same type as orifice 12 of Fig. 1), each orifice being under the control of a master regulator and a proportioning relay. Orifices 12a and 12b are connected in parallel to each other by branch pipes 130 and 131, but in series with a suction line 9' having a fixed orifice 11 therein between orifices 12a and 12b and the end of the pipe line which is connected to the furnace outlet.

Orifice 12a is operated by pressure impulses transmitted to line 13 by relay P. R. as effected by master regulator M. R., while orifice 12b is operated by pressure impulses transmitted to line 132 by a proportioning relay P. R. b. as effected by pressure impulses transmitted to line 133 by master regulator M. R. 2. Thus orifices 12a and 12b are adjusted by and in accordance with the amount of fuel delivered to the furnace by apparatus 2 and the supply source of gaseous fuel, respectively. Since orifices 12a and 12b are in parallel, it will be apparent that the resistance offered to the flow of atmospheric air to orifice 11 will be proportional to the product of the resistances of orifices 12a and 12b divided by the sum of their resistances.

Since the amount of air passing through line 9' is dependent on the flow resistance offered by orifices 12a and 12b, and since this in turn is dependent on the load and the rate of fuel supplied by all sources of supply, it follows that the draft at the outlet of the furnace as effected by the setting of the outlet damper 5 will vary by and in accordance with the load and the total amount of the several fuels delivered to the furnace. Since the amount of air delivered to the furnace is dependent on the draft, it also follows that the proper relation between the rate of air supply and the rate of total fuel supplied to the furnace will be maintained.

As in the case of regulator 7 and float mechanism 8 of Fig. 1, which operates to maintain a constant pressure between orifices 11 and 12, regulator 7 and float mechanism 8 in Fig. 8 will so adjust outlet damper 5 that the constant pressure is maintained between orifices 11 and 12a—12b.

In the system shown in Fig. 8, master regulator M. R. 2 may be given a different calibration than regulator M. R. so that no gaseous fuel is supplied to the furnace until the fuel supply mechanism 2 has reached its maximum capacity, or master regulator M. R. 2 and its associated relay P. R. b. may be adjusted or calibrated to effect the delivery of gaseous fuel throughout either the entire range, or any part of the operating range of fuel feeding apparatus 2.

From the description of the various embodiments of the invention, it will be apparent that the same type of regulator may be employed in all cases where orifices 11 and 12 or 11 and 12a, 12b are utilized because the pressures whether positive or negative, to which the float mechanisms respond are substantially constant and may be entirely different in value from the pressure conditions undergoing regulation. The only time that these float mechanism actuating pressures (positive or negative) would be comparable to the controlled pressures (positive or negative) would be when the controlled pressures are equal to or nearly equal to the pressures between the control orifices 11 and 12, or 11 and 12a—12b. But even in that case the float mechanism actuating pressures would be within the operating range as these pressures are held to a substantially constant value.

In Figs. 7 and 8 substantially the same type of regulators and control orifices are illustrated as were described in connection with Fig. 1. Therefore, such regulators and other apparatus illustrated in Figs. 7 and 8 which are the same as in Fig. 1 will have the same reference characters applied thereto to indicate the same parts and elements that are shown and described in connection with Fig. 1. Since the mechanisms illustrated in Figs. 7 and 8 are for the most part similar to those described in connection with Fig. 1, further detailed description of structure and operation is believed unnecessary.

While several forms of the invention have been shown and described herein it will be appreciated by those skilled in this art that various modifications and changes may be made without departing either from the spirit or the scope of the invention. It is desired, therefore, that only such limitations shall be placed on the invention as are imposed by the prior art and the appended claims.

What I claim as new and desire to secure by Letters Patent is:

1. In combination, a regulator having a suction responsive element adjusted for equilibrium at a predetermined value of suction for causing the regulator to move in one direction or another in response to a departure of the suction from said value, a suction line having one end connected to furnace outlet and the other open to the atmosphere, fixed and adjustable orifices in the suction line and a damper in the furnace outlet operated by the regulator, a connection between said orifices to the suction element of the regulator, and means responsive to a condition to be controlled for adjusting the adjustable orifice, said regulator being operated in response to such adjustment to shift the damper and restore the suction in the line between said orifices to said predetermined value.

2. In combination, a source of suction, a conduit connected to said source, means for adjusting the suction at the point of connection to the source, spaced orifices in said conduit, means for adjusting one of said orifices to vary the suction in the conduit between said orifices in accordance with a condition to be controlled, and means responsive to a change in suction in the conduit between said orifices for adjusting the suction source to restore the suction in the conduit between the orifices to the value which existed therein before the change in adjustment of the adjustable orifice was made.

3. In apparatus for regulating the suction at the outlet of boiler furnace, the combination with an outlet damper and a regulator for adjusting the damper, of a suction line connected at one end to the outlet of the furnace and having the other end open to the atmosphere, a fixed orifice in said line, an adjustable orifice between the fixed orifice and the open end of said line, suction responsive mechanism connected to the line between said orifices and adjusted to shift the damper to such position as will maintain the suction in the portion of the line between said orifices substantially constant, and means responsive to variations in load on the boiler for adjusting the adjustable orifice by and in accordance with such load changes.

4. The combination with a boiler furnace having fuel supply regulating apparatus, draft regulating apparatus, a source of air supply, and means for regulating the air supply by and in accordance with the draft at the furnace outlet, of means for controlling the fuel supply and draft regulating apparatus by and in accordance with the demand for steam, the controlling means for the draft regulating apparatus comprising a suction line connected at one end to the furnace outlet and having its opposite end open to the atmosphere, a fixed orifice in said line and an adjustable orifice between the open end of the suction line, and the fixed orifice, and a connection from the draft regulating apparatus to the suction line at a point between the orifices, said draft regulating apparatus being adjusted to maintain the suction between the orifices constant, and means responsive to and under the control of the steam responsive controlling means for adjusting the adjustable orifice by and in accordance with the demand for steam.

5. In combination, a duct, means for passing a gaseous medium through the duct, a regulating element in the duct for regulating said medium, a conduit connected at one end to said duct and open to the atmosphere at the other through which a gaseous flow takes place, a variable orifice and a fixed orifice in said conduit, the fixed orifice being between the duct and the variable orifice, mechanism responsive to the pressure between said orifices for operating the duct regulating element to maintain a substantially constant pressure between the orifices, and means for operating said variable orifice in response to changes in a condition affected by the medium passing through said duct.

6. In regulating apparatus, the combination with a main duct, means for passing a gaseous medium through the duct, and a regulating element in the duct for regulating said medium, of an auxiliary conduit connected in parallel to the main duct in flow communication therewith, a variable orifice and a fixed orifice in the conduit on the discharge side of the variable orifice, means for adjusting the variable orifice in accordance with a variable condition to thereby vary the pressure between said orifices, and means responsive to a change in pressure between the orifices for adjusting the regulating element in said duct by and in accordance with such change in pressure so as to maintain the pressure between said orifices substantially constant.

7. In combination with a furnace, a duct in which a gaseous medium essential to combustion is carried under positive pressure, a source of supply of such medium, dampers at spaced points in said duct and located between the source of supply and the inlet thereof to the furnace, an auxiliary conduit connected to the duct at a point between said dampers, said conduit having an adjustable orifice and a fixed orifice between the adjustable orifice and the duct, and means responsive to changes in pressure between said orifices for so adjusting one of said dampers that the pressure between said orifices is maintained substantially constant.

8. In combination with a furnace, a duct in which a gaseous medium essential to combustion is carried under positive pressure, a source of supply of such medium, dampers at spaced points in said duct and located between the source of supply and the inlet thereof to the furnace, an auxiliary conduit connected to the duct at a point between said dampers, said conduit having an adjustable orifice and a fixed orifice between the adjustable orifice and the duct, means responsive to changes in pressure between said orifices for so adjusting one of said dampers that the pressure between said orifices is maintained substantially constant, and means responsive to a condition requiring a change in the rate of furnace combustion for adjusting said adjustable orifice to effect a change in pressure between said orifices.

9. In combination with a furnace, a duct in which a gaseous medium essential to combustion is carried under positive pressure, a source of supply of such medium, dampers at spaced points in said duct and located between the source of supply and the inlet thereof to the furnace, an auxiliary conduit connected to the duct at a point between said dampers, said conduit having an adjustable orifice and a fixed orifice between the adjustable orifice and the duct, means for so adjusting one of said dampers that a predetermined pressure condition is maintained in the furnace combustion chamber, and means responsive to a change in pressure between said orifices as affected by the adjustment of said dampers for so adjusting the other of said dampers that such a change in pressure will be affected in said duct as will maintain the pressure between said orifices substantially constant.

10. In combination with a furnace, a duct in which a gaseous medium essential to combustion is carried under positive pressure, a source of supply of such medium, dampers at spaced points in said duct and located between the source of supply and the inlet thereof to the furnace, an auxiliary conduit connected to the duct at a point between said dampers, said conduit having an adjustable orifice and a fixed orifice between the adjustable orifice and the duct, means for so adjusting one of said dampers that a predetermined pressure condition is maintained in the furnace combustion chamber, means responsive to a change in pressure between said orifices as affected by the adjustment of said dampers for so adjusting the other of said dampers that such a change in pressure will be affected in said duct as will maintain the pressure between said orifices substantially constant, and means responsive to a condition requiring a change in the rate of furnace combustion for adjusting said adjustable orifice to effect a change in pressure between said orifices.

11. A control system for furnaces having a plurality of sources of supply of different fuels, a regulatable source of air supply, a draft regulating element in the outlet of the furnace, means responsive to variations in pressure in the combustion space of the furnace for regulating the air supply to maintain a substantially constant pressure in said space, and means responsive to the demand for combustion for regulating the sources of fuel supply in accordance with such demand, of means under the control of the combustion demand responsive means for controlling the draft regulating element by and in accordance with the total rate at which fuel is delivered by said sources of supply to the furnace.

12. A control system for boiler furnaces having a plurality of sources of supply of different fuels, a regulatable source of air supply, a draft regulating element in the outlet of the furnace, means responsive to variations in pressure in the combustion space of the furnace for regulating the air supply to maintain a substantially constant pressure in said space, a regulator responsive to the demand for steam for regulating one of said sources of fuel supply, a regulator responsive to the demand for steam for regulating another of said sources of supply in accordance with the demand for steam, of means under the joint control of the steam demand responsive regulators for controlling the draft regulating element by and in accordance with the total rate at which fuel is delivered to the furnace by said sources of supply.

13. A control system for boiler furnaces having a plurality of sources of supply of different fuels, a regulatable source of air supply, a draft regulating element in the outlet of the furnace, means responsive to variations in pressure in the combustion space of the furnace for regulating the rate at which air is supplied to maintain a substantially constant pressure in said space, a regulator responsive to the demand for steam for regulating one of said sources of fuel supply in accordance with the demand for steam, a regulator responsive to the demand for steam for regulating another of said sources of supply in accordance with the demand for steam, of an air flow conduit connected to the outlet of the furnace and having a pressure differential thereacross substantially equal to the draft loss occurring in the furnace from the combustion space to the furnace outlet, a plurality of adjustable orifices in said conduit, an adjustable orifice between said adjustable orifices and the furnace outlet, one of said orifices being actuated by one of the steam demand responsive regulators and another being actuated by another of said steam demand responsive regulators, and means responsive to the pressure in said conduit adjacent the upstream side of the fixed orifice for so adjusting the draft regulating element that a substantially constant pressure is maintained between said adjustable and fixed orifices.

14. A control system for boiler furnaces having a plurality of sources of supply of different fuels, a regulatable source of air supply, a draft regulating element in the outlet of the furnace, means responsive to variations in pressure in the combustion space of the furnace for regulating the air supply to maintain a substantially constant pressure in said space, a regulator responsive to the demand for steam for regulating one of said sources of fuel supply in accordance with the demand for steam, a regulator responsive to the demand for steam for regulating another of said sources of fuel supply in accordance with the demand for steam, of an air flow conduit having one end connected to the furnace outlet and the other end connected to a plurality of parallel branch pipes which are open to the atmosphere, adjustable orifices in the branch pipes and a fixed orifice in the conduit, means operated by one of the steam demand responsive regulators for operating one of said adjustable orifices, means operated by another of said steam responsive regulators for adjusting another of said adjustable orifices, and means responsive to the pressure adjacent the upstream side of the fixed orifice for so operating said draft regulating element that a substantially constant pressure is maintained in the conduit between said fixed and adjustable orifices.

15. In a control system, a plurality of conduits connected in parallel to carry a flowing medium, a regulating element in one of said conduits between the points of parallel connection so that a change in flow through the conduit having said regulating element therein causes a change in flow through another of said conduits, a fixed orifice in said latter conduit and an adjustable orifice therein on the upstream side of the fixed orifice, means for regulating the adjustable orifice in accordance with a condition to be controlled thereby to change the pressure between said orifices, and means responsive to the change in pressure between said orifices for adjusting said first mentioned regulating element so as to maintain the pressure drop across the adjustable orifice substantially constant.

16. In combination, a plurality of conduits carrying a flowing medium and a single conduit into which said plurality of conduits deliver said medium, a regulating element in one of said conduits, an adjustable orifice and a fixed orifice in another of said conduits, the fixed orifice being on the discharge side of the adjustable orifice, means for regulating the adjustable orifice in accordance with a condition to be controlled, and means responsive to the pressure between said orifices for adjusting said regulating element so as to maintain the pressure drop across the adjustable orifice substantially constant.

GEORGE W. SMITH.